United States Patent
Shelton et al.

(10) Patent No.: US 8,260,513 B2
(45) Date of Patent: Sep. 4, 2012

(54) PRODUCING VEHICLE CREEP THROUGH A TRANSMISSION WITHOUT A TORQUE CONVERTER

(75) Inventors: Matthew J. Shelton, Grosse Ile, MI (US); Hong Jiang, Canton, MI (US); Chunlin Liu, Plymouth, MI (US); Zhengyu Dai, Canton, MI (US); Michael G. Fodor, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 12/785,629

(22) Filed: May 24, 2010

(65) Prior Publication Data

US 2011/0288735 A1 Nov. 24, 2011

(51) Int. Cl.
*G06F 17/00* (2006.01)

(52) U.S. Cl. .......................................................... 701/68

(58) Field of Classification Search .................... 701/68; 477/71, 174; 180/170
See application file for complete search history.

(56) References Cited

U.S. PATENT DOCUMENTS

| | | | |
|---|---|---|---|
| 5,275,267 A | 1/1994 | Slicker | |
| 6,317,671 B1 | 11/2001 | Tsutsui et al. | |
| 6,730,001 B1 | 5/2004 | Vohmann et al. | |
| 6,790,159 B1 | 9/2004 | Buchanan et al. | |
| 7,025,708 B2 | 4/2006 | Rieger et al. | |
| 7,153,235 B2 | 12/2006 | Takamura et al. | |
| 7,169,082 B2 | 1/2007 | Rieger et al. | |
| 7,329,206 B2 | 2/2008 | Tanaka | |
| 2004/0166991 A1* | 8/2004 | Buchanan et al. | 477/174 |
| 2006/0040788 A1* | 2/2006 | Bassler | 477/71 |
| 2009/0127012 A1* | 5/2009 | Leibbrandt et al. | 180/170 |

OTHER PUBLICATIONS

"Engine Speed Control"; Peter Wellstead & Mark Readman; Control Systems Principles; Sep. 2008.*

* cited by examiner

*Primary Examiner* — John Pauls
(74) *Attorney, Agent, or Firm* — David B. Kelley; MacMillan, Sobanski & Todd, LLC

(57) ABSTRACT

A method for controlling creep in a vehicle having no transmission torque converter, includes operating an input clutch of the transmission at a desired clutch torque capacity, using a feed-forward engine torque to minimize the impact on the engine speed when additional load on the engine occurs from increasing the clutch torque capacity, producing a desired clutch slip by controlling engine idle speed, and achieving a desired vehicle speed by controlling the input clutch torque capacity.

16 Claims, 5 Drawing Sheets

PRODUCING VEHICLE CREEP THROUGH A TRANSMISSION WITHOUT A TORQUE CONVERTER

BACKGROUND OF THE INVENTION

1. Field of the Invention

This invention relates generally to a vehicle powertrain, and, in particular, to providing vehicle creep through a transmission having an input clutch but no torque converter.

2. Description of the Prior Art

A powershift transmission is a geared mechanism employing two input clutches used to produce multiple gear ratios in forward drive and reverse drive. It transmits power continuously using synchronized clutch-to-clutch shifts.

The transmission incorporates gearing arranged in a dual layshaft configuration between the transmission input and its output. One input clutch transmits torque between the input and a first layshaft associated with even-numbered gears; the other input clutch transmits torque between the transmission input and a second layshaft associated with odd-numbered gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

During a vehicle launch condition in a conventional vehicle whose powertrain includes a powershift transmission, the engine and transmission are concurrently controlled in a coordinated manner to provide acceptable vehicle launch performance. In a powershift transmission vehicle application, providing consistent and acceptable vehicle launch performance can be a rather difficult control problem due to the lack of a torque converter. During a vehicle launch condition in this type of vehicle application, the torque capacity of the transmission clutch and slip across the clutch are carefully controlled in coordination with the engine torque to provide the desired vehicle response.

A dual clutch transmission (DCT) has no torque converter for providing vehicle creep, wherein the vehicle moves slowly when the brake pedal is released. Vehicle operators of automatic transmissions have come to expect the creep function; therefore, a vehicle having a DCT must provide vehicle creep using a clutch instead of a torque converter. A need exists in the industry for a creep control that performs as predictably and smoothly as a conventional automatic transmission, in which a torque converter provides a drive connection between a power source and the driven wheels through the transmission.

SUMMARY OF THE INVENTION

A method for controlling creep in a vehicle having no transmission torque converter, includes operating an input clutch of the transmission at a desired clutch torque capacity, using a feed-forward engine torque to minimize the affect on engine speed, i.e., to prevent an engine speed dip or flare, when additional load on the engine occurs from increasing the clutch torque capacity, and to produce a desired clutch slip by controlling engine idle speed. Clutch torque capacity is controlled to achieve a desired vehicle speed.

The vehicle creep torque control simulates the torque converter function and limits the energy transmitted to the input clutch using a torque based approach to provide the vehicle creep function to a powershift transmission.

The DCT creep mode behaves as predictably and smoothly as any standard automatic transmission with a torque converter.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
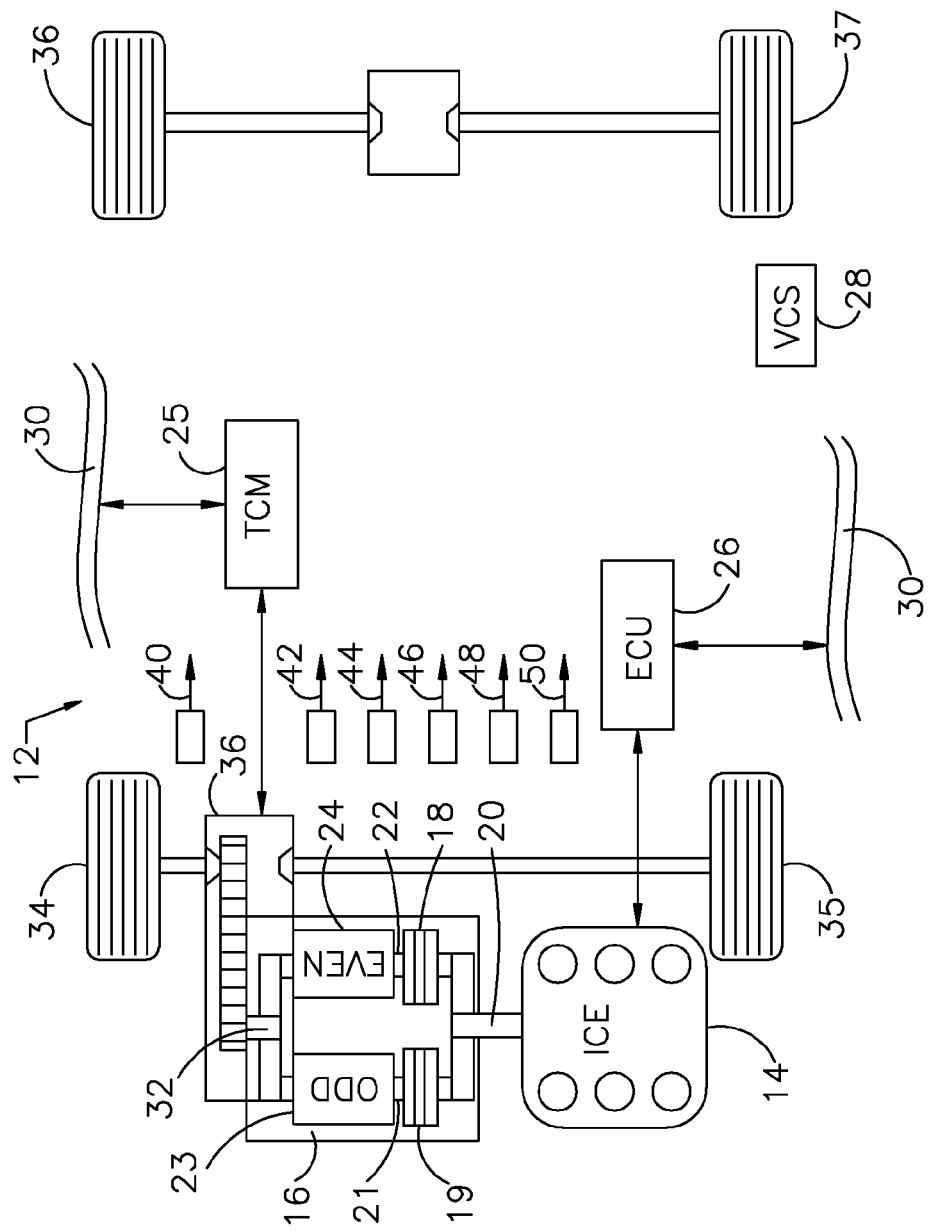
FIG. 1 is a schematic diagram of a vehicle powertrain system, to which the creep control can be applied.

As shown in FIG. 1, a vehicle powertrain 12 includes an engine 14, such as a diesel or gasoline engine; and a transmission 16, preferably a dual clutch powershift transmission having two input clutches, but no torque converter.

The input clutches 18, 19 alternately connect shaft 20 to transmission inputs 21, 22 to the odd-numbered gears 23 and even-numbered gears 24, respectively. An electronic transmission control module (TCM) 25 controls the input clutches and gearbox state through command signals to servos that actuate the input clutches 18, 19 and gearbox shift forks and synchronizers. An electronic engine control module (ECU) 26 controls operation of engine 14. A vehicle control system (VCS) 28, issues control commands to the TCM and ECM carried on a communication bus 30. Each of the TCM 25, VCS 28 and ECM 46 includes a microprocessor accessible to electronic memory and containing control algorithms expressed in computer code, which are executed repeatedly at frequent intervals. The engine 14 provides vehicle propulsion by transmitting torque through transmission 16 to driven vehicle wheels 34, 35. Wheels 36, 37 are not driven.

The torque transmitting capacity of clutches 18, 19 varies in accordance with actuation of a servo under control of the TCM 25. Preferably each input clutch 18, 19 is actuated by a respective electric motor. The shaft of a first motor is connected to the plates of clutch 18, and the angular position of that shaft determines the torque transmitting capacity of clutch 18. Similarly, the shaft of a second motor is connected to the plates of clutch 19, and the angular position of that shaft determines the torque transmitting capacity of clutch 19. Alternatively, each clutch servo can be hydraulically actuated such that the torque capacity of each input clutch varies with a variable magnitude of hydraulic pressure supplied to the respective clutch.

Engine crankshaft torque varies in accordance with control signals sent to the engine from the ECU 26 in response to demanded wheel torque produced by the vehicle operator. Input signals representing brake pressure 40, clutch temperature 42, clutch slip 44, vehicle speed 46, vehicle inclination 48 and current transmission gear 50 produced by respective sensors are transmitted on bus 30 to the TCM 25, ECU 26 and VCS 28.

Figure 2:
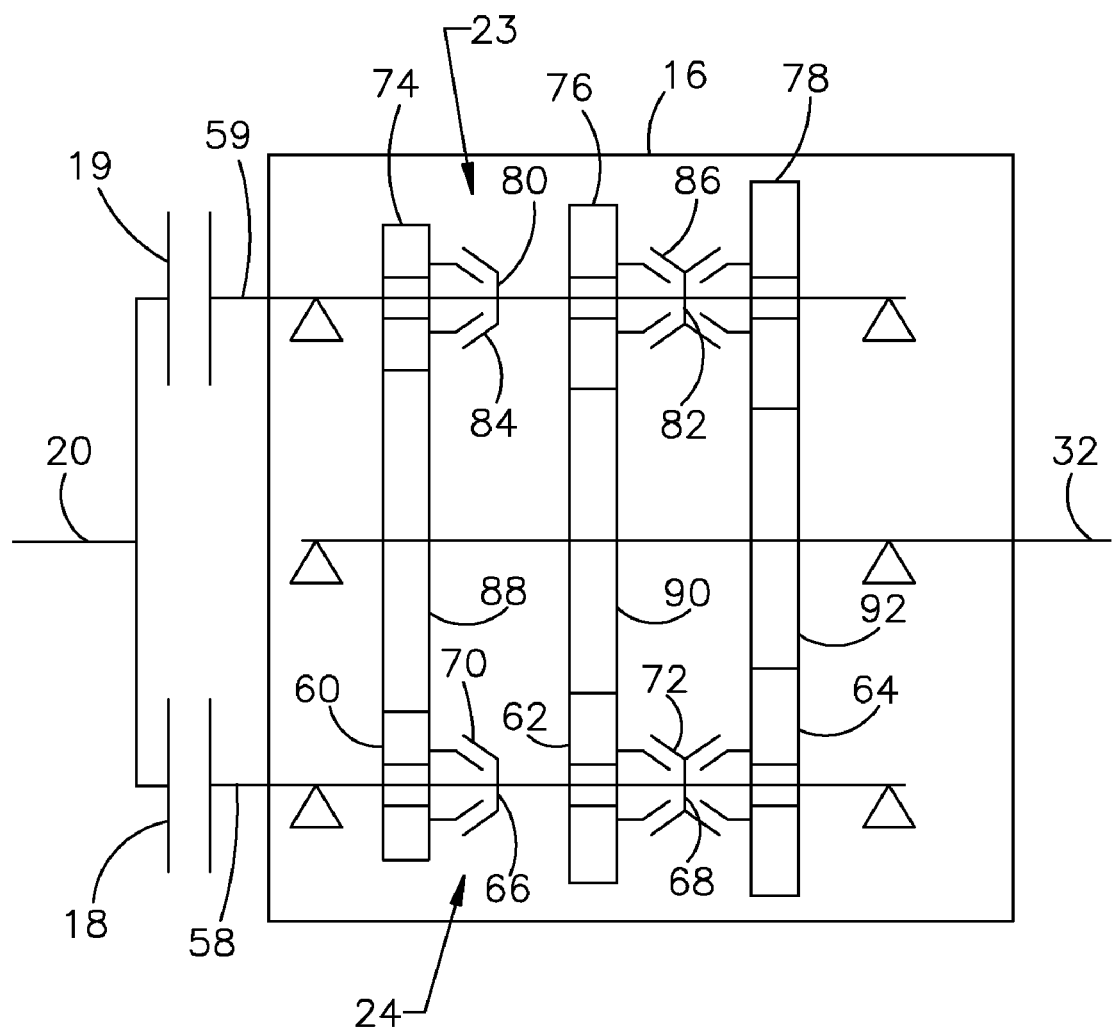
FIG. 2 is a schematic diagram showing details of a powershift transmission.

FIG. 2 illustrates details of a powershift transmission 16 including input clutch 18, which selective connects the input 20 of transmission 16 alternately to the even-numbered gears 24 associated with a first layshaft 58, and input clutch 19, which selective connects the input 20 alternately to the odd-numbered gears 23 associated with a second layshaft 59.

Layshaft 60 supports pinions 60, 62, 64, which are each journalled on shaft 58, and couplers 66, 68, which are secured to shaft 58. Pinions 60, 62, 64 are associated respectively with the second, fourth and sixth gears. Coupler 66 includes a sleeve 70, which can be moved leftward to engage pinion 60 and driveably connect pinion 60 to shaft 58. Coupler 68 includes a sleeve 72, which can be moved leftward to engage pinion and driveably connect pinion to shaft 58, and can be moved rightward to engage pinion 64 and driveably connect pinion 64 to shaft 58.

Layshaft 59 supports pinions 74, 76, 78, which are each journalled on shaft 59, and couplers 80, 82, which are secured to shaft 59. Pinions 74, 76, 78 are associated respectively with the first, third and fifth gears. Coupler 80 includes a sleeve 84, which can be moved leftward to engage pinion 74 and driveably connect pinion 74 to shaft 59. Coupler 82 includes a sleeve 86, which can be moved leftward to engage pinion 76 and driveably connect pinion 76 to shaft 59, and can be moved rightward to engage pinion 78 and driveably connect pinion 78 to shaft 59.

Transmission output 32 supports gears 88, 90, 92, which are each secured to shaft 32. Gear 88 meshes with pinions 60 and 74. Gear 90 meshes with pinions 62 and 76. Gear 92 meshes with pinions 64 and 78.

Couplers 66, 68, 80 and 82 may be synchronizers, or dog clutches or a combination of these. Although operation of the transmission 16 is described with reference to forward drive only, the transmission can produce reverse drive by incorporating a reverse idler gear in one of the lower gear power paths and a reverse coupler for engaging reverse drive. One of the input clutches 18, 19 would be engaged when reverse drive operation is selected.

Figure 3:
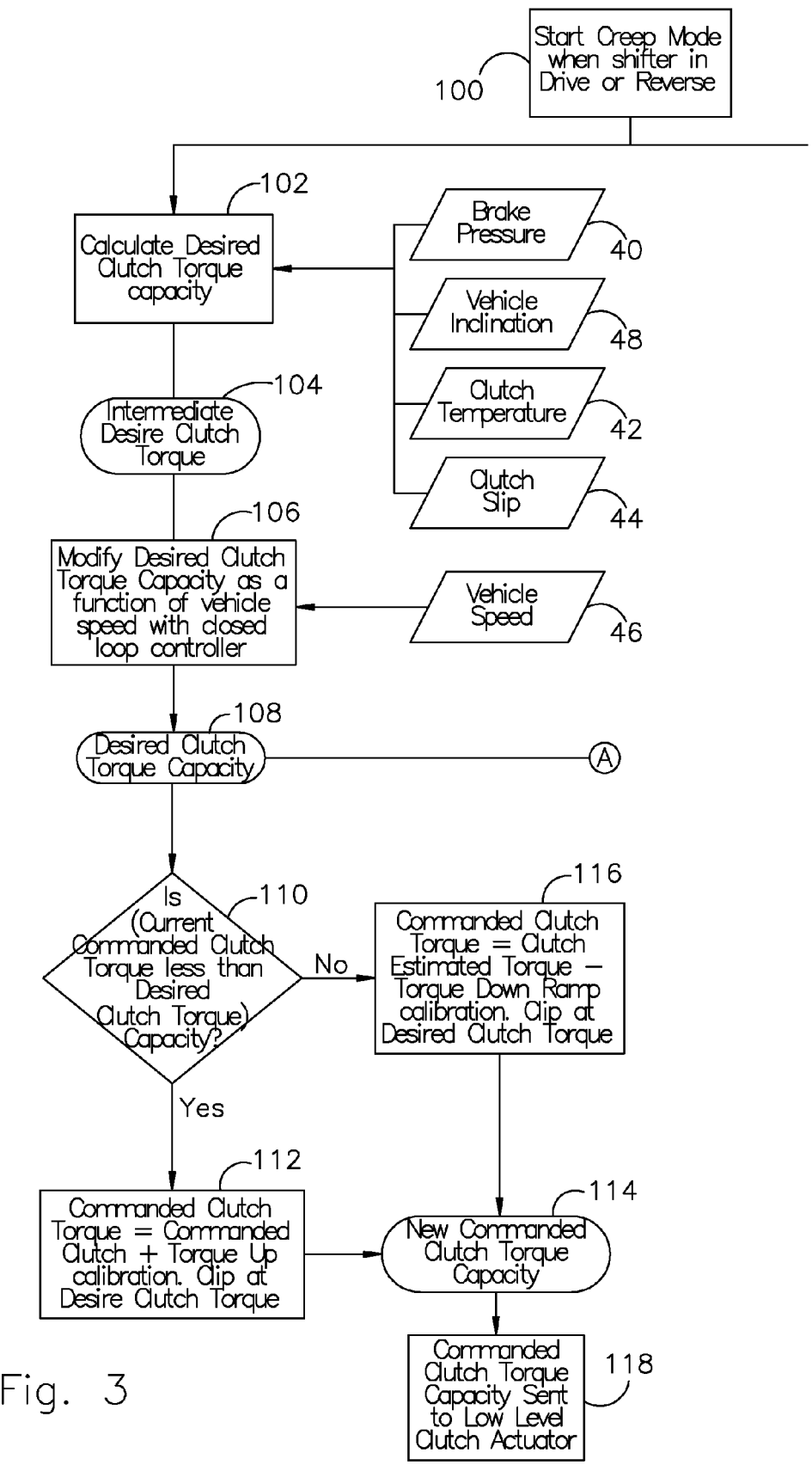
FIG. 3 is a diagram illustrating the vehicle creep control method steps.
Figure 3:
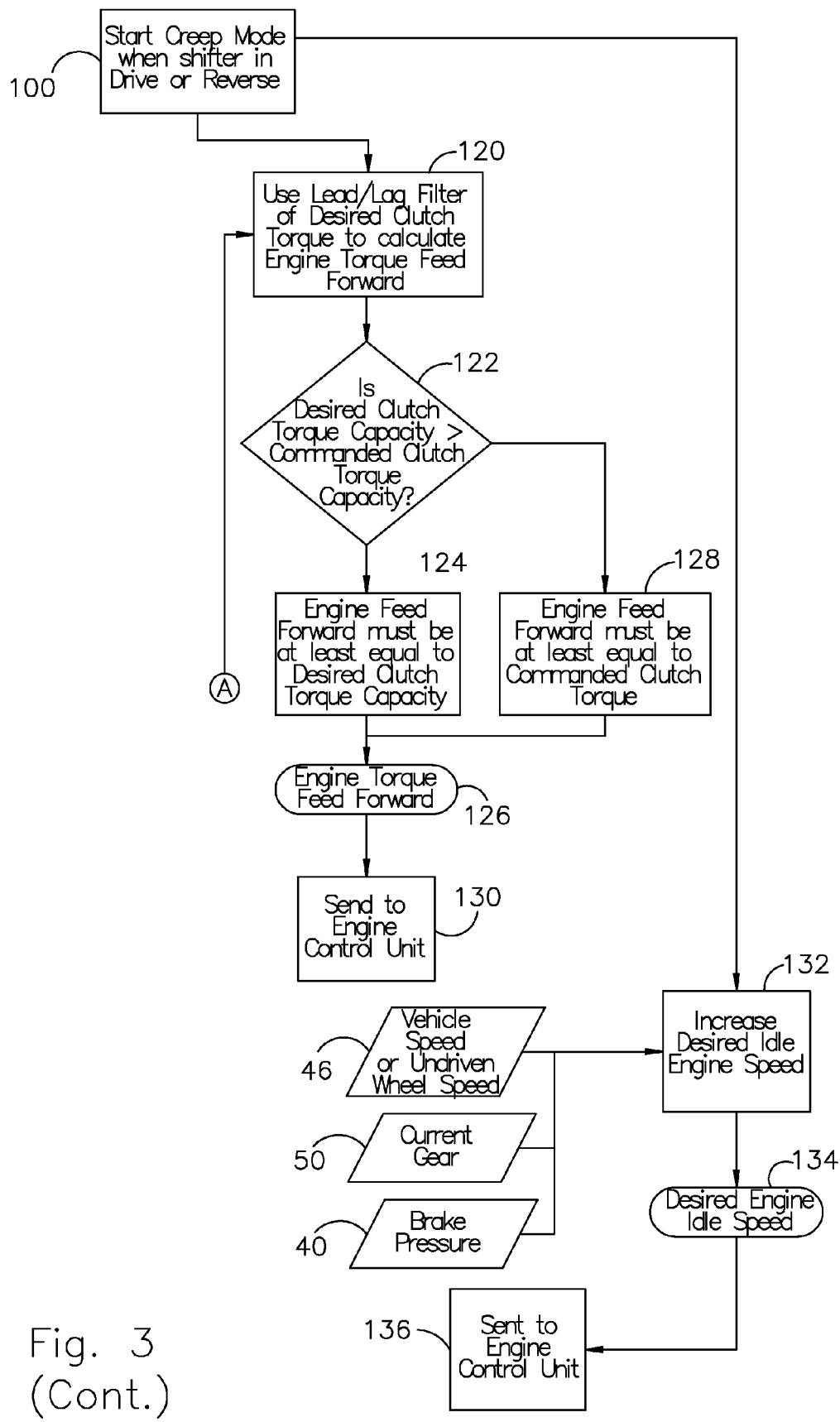

The steps of an algorithm for controlling vehicle launch using the powertrain 12 illustrated of FIG. 1 are shown in the method steps diagram of FIG. 3.

At step 100 creep control is initiated when the transmission gear selector is placed in the D (drive) or R (reverse) range, whereupon the magnitudes of desired torque to be transmitted through one of the input clutches 18, 19, feed-forward engine torque, and desired engine idle speed are determined.

At step 102, the desired clutch torque is related to the brake torque, but brake pressure is used instead of brake pedal position because the brake pressure relates better to the brake torque and it can be easily measured. Brake pressure can differ for a given brake pedal position.

With the brake pedal fully depressed, the desired clutch torque capacity is determined from among completely-open, nearly-stroked, and slipping or slightly-engaged states using empirical data, from which desired clutch torque capacity is determined. By not applying excess clutch torque, this calibration prevents unnecessary wear on the clutch when vehicle creep movement is not desired. As the brake pedal is released, the desired clutch torque capacity increases as the brake pressure decreases.

At step 104, the initial desired clutch torque capacity 102 is modified by referencing the desired engine idle speed with other variables than brake pressure including vehicle inclination 48, clutch temperature 42, clutch slip 44, and vehicle speed 46 or undriven wheel speed, if available, thereby determining an intermediate desired clutch torque capacity. If the vehicle is on an incline, the desired clutch torque capacity can be increased to compensate for the road slope. Because clutch temperature will affect the desired clutch torque capacity for failure mode cases, the desired engine idle speed can be referenced with clutch slip to further modify the initial desired clutch torque capacity.

At step 106 a closed loop controller is used to modify the desired clutch torque capacity 104 based on the current vehicle speed 46 or undriven wheel speed, thereby producing the desired clutch torque capacity 108. As the vehicle accelerates, the desired clutch torque capacity 108 is reduced as a function of the vehicle speed or undriven wheel speed. This reduction in clutch torque capacity 104 allows a maximum vehicle speed to be calibrated for vehicle creep control, and allows a coasting vehicle to enter into the creep mode when the vehicle speed is low enough that the input clutch 18, 19 can no longer be locked. If the vehicle rolls backward on the incline, a vehicle speed modifier will increase clutch torque capacity to compensate. The commanded clutch torque will ramp to the desired clutch torque 108 at a calibrateable rate.

At step 110, a test is made to determine whether current commanded clutch torque capacity is less than the desired clutch torque capacity 108. Commanded clutch torque capacity is the clutch torque capacity being commanded by the creep control algorithm during its current execution loop. If the result of test 110 is logically true, at step 112 a new commanded clutch torque capacity 114 is set equal to the commanded clutch torque capacity plus a calibrated incremental torque. The magnitude of the new commanded clutch torque capacity 114 is clipped at the desired clutch torque capacity 108.

If the result of test 110 is logically false, at step 116 a new commanded clutch torque capacity 114 is set equal to the current clutch estimated torque capacity minus a calibrated decremental torque. The magnitude of new commanded clutch torque capacity 114 is clipped at the desired clutch torque capacity 108. The increment and decrement ramps are used to control the rate of change of the commanded clutch torque capacity to desired clutch torque capacity.

At step 118, a signal representing the new commanded clutch torque capacity 114 determined in the current execution loop is sent to a low level clutch actuator in TCM 24. The control updates and produces the new commanded clutch torque capacity 114 in the next execution loop and eventually produces the desired clutch torque capacity.

Because the response time of the clutch 18, 19 is fast relative to that of the engine 14, feed-forward engine torque is used to prepare the engine for an increase in engine load represented by increases in clutch torque capacity as required to produce vehicle creep speed. For example, if clutch torque capacity is greater than engine torque, engine speed will slow, whereas maintaining engine idle speed is the desired objective.

Figure 4:
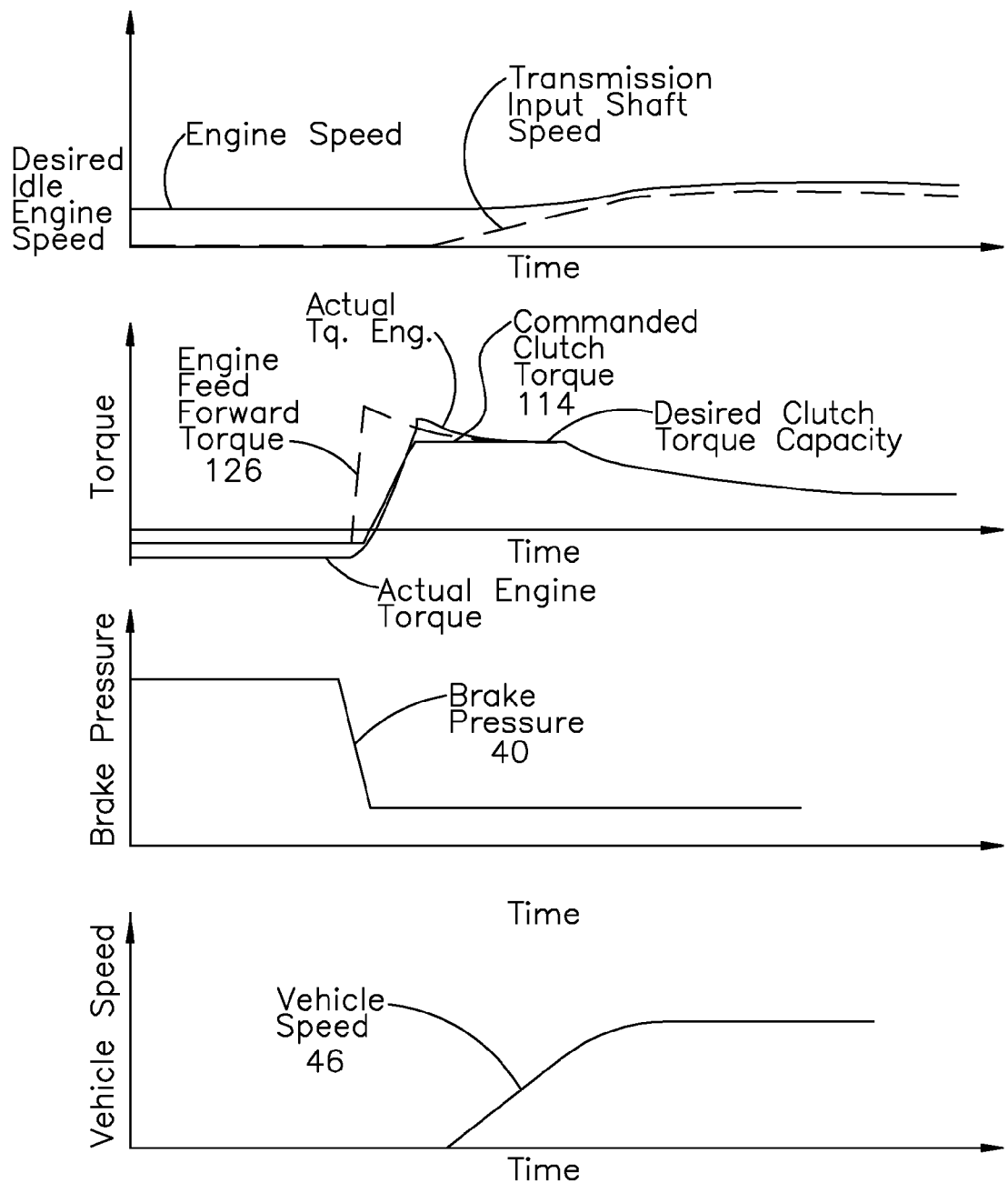
FIG. 4 are graphs that show the variation with time of several powertrain parameters due to vehicle creep control.

At step 120, the desired clutch torque capacity 108 is sent to a lead/lag filter in the ECU 26 as a feed-forward variable, which is used to compensate for increased engine load due to drag of the clutch 18, 19. At step 120, the lead-lag filter sends initially a signal representing a large demanded torque to the engine. This large demanded engine torque signal opens the engine throttle faster than otherwise it would open, causing the engine intake manifold to fill faster and to shorten the engine torque response time. The lead-lag filter reduces the feed-forward torque 126 to the actual desired clutch torque capacity 108 over a calibrateable time period. FIG. 4 illustrates that the feed-forward engine torque 126 reduces the impact on the engine speed by preventing an engine speed dip or flare when additional load on the engine occurs due to increasing the clutch torque capacity.

At step 122, a test is made to determine whether desired clutch torque capacity 108 is greater than the new commanded clutch torque capacity 114. If the result of test 122 is true, at step 124 engine feed forward torque 126 is set equal to or greater than desired clutch torque capacity 108.

If test 122 is false, at step 128 engine feed forward torque 126 is set equal to the new commanded clutch torque capacity 114.

At step 130, a signal representing engine feed forward torque 126 is sent to ECU 26. The feed-forward engine torque 126 signal allows changes in clutch torque capacity and engine torque to be coordinated to prevent engine stall, engine speed flares or dips, and driveline oscillations.

As vehicle speed increases, engine speed can be increased to control clutch slip. At step 132 the transmission desired engine idle speed is increased as a function of vehicle speed 46 or undriven wheel speed, brake pressure 40, and the current transmission gear 50. The output of the function is the transmission desired engine idle speed 134.

At step 136, a signal representing the transmission desired engine idle speed 134 is sent to ECU 26, where a closed loop engine idle speed controller produces the desired engine idle speed 134. Clutch slip is controlled also by setting engine idle speed based on current vehicle speed or undriven wheel speed. Clutch slip is the input shaft speed subtracted from the engine speed. The input shaft speed can be calculated from the vehicle speed or undriven wheel speed based on the current gear ratio, final drive ratio and tire size.

FIG. 4 shows the rapid increase of feed-forward engine torque 126 occurring shortly after wheel brake pressure decreases and while engine torque and commanded clutch torque are low, followed by an increase in engine torque overshooting desired and commanded clutch torque, followed by desired and commanded clutch torque becoming and remaining substantially equal shortly after vehicle creep speed increases and during the remainder of the period while creep control is operative. FIG. 4 shows that slip across the input clutch 18, 19, i.e., the difference between engine speed and transmission input shaft speed 20 is maintained at a desired slip during the period while commanded and desired clutch torque capacity are substantially equal.

In accordance with the provisions of the patent statutes, the preferred embodiment has been described. However, it should be noted that the alternate embodiments can be practiced otherwise than as specifically illustrated and described.

The invention claimed is:

1. A method for controlling vehicle creep using a transmission clutch, comprising:
   (a) calculating a desired clutch torque that is inversely proportional to brake pressure;
   (b) using a closed-loop controller to change the desired clutch torque inversely with vehicle speed;
   (c) ramping clutch torque to the desired clutch torque by increasing engine torque followed by reducing engine torque to the desired clutch torque over a predetermined period;
   (d) varying engine speed automatically to produce vehicle creep.

2. The method of claim 1, wherein step (c) further comprises:
   if a current commanded clutch torque is less than the desired clutch torque, increasing at a predetermined time rate the current commanded clutch torque to the desired clutch torque using a torque increase ramp.

3. The method of claim 1, wherein step (c) further comprises:
   if a current estimate of clutch torque capacity is equal to or greater than the desired clutch torque, decreasing at a predetermined time rate the current estimate of clutch torque capacity to the desired clutch torque using a torque decrease ramp.

4. The method of claim 1, wherein step (a) further comprises calculating the desired clutch torque capacity as a function of wheel brake pressure, vehicle inclination, clutch temperature and clutch slip.

5. The method of claim 1, wherein step (b) further comprises:
   using a closed loop controller, a current desired clutch torque capacity and vehicle speed and to determine the desired clutch torque capacity.

6. The method of claim 1, wherein step (c) further comprises:
   if the desired clutch torque capacity is greater than a commanded clutch torque capacity, setting the increase in engine torque equal to or greater than the desired clutch torque capacity.

7. The method of claim 1, wherein step (d) further comprises:
   if the desired clutch torque capacity is equal to or less than the commanded clutch torque, setting the increase in engine torque equal to or greater than a commanded clutch torque capacity.

8. The method of claim 1, wherein step (d) further comprises:
   using vehicle speed and a speed ratio produced by a current gear of the transmission to determine a desired engine idle speed at which a desired slip across the clutch is produced; and
   producing the desired engine idle speed.

9. A method for controlling vehicle creep using a transmission clutch, comprising:
   (a) determining a desired clutch torque that is inversely proportional to brake pressure;
   (b) using a closed-loop controller to change the desired clutch torque as a function of vehicle speed;
   (c) ramping clutch torque to the desired clutch torque at a calibrated rate;
   (d) increasing engine torque followed by reducing engine torque to the desired clutch torque over a predetermined period;
   (e) varying engine speed automatically to produce vehicle creep.

10. The method of claim 9, wherein step (c) further comprises:
    if the current commanded clutch torque is less than the desired clutch torque, increasing at a predetermined time rate the current commanded clutch torque to the desired clutch torque using a torque increase ramp.

11. The method of claim 9, wherein step (c) further comprises:
    if a current estimate of clutch torque capacity is equal to or greater than the desired clutch torque, decreasing at a predetermined time rate the current estimate of clutch torque capacity to the desired clutch torque using a torque decrease ramp.

12. The method of claim 9, wherein step (b) further comprises:
    calculating the desired clutch torque capacity as a function of wheel brake pressure, vehicle inclination, clutch temperature and clutch slip.

13. The method of claim 9, wherein step (b) further comprises:
using a closed loop controller, the desired clutch torque capacity and vehicle speed and to update the desired clutch torque capacity.

14. The method of claim 9, wherein step (c) further comprises:
if the desired clutch torque capacity is greater than a commanded clutch torque capacity, setting the increase in engine torque equal to or greater than the desired clutch torque capacity.

15. The method of claim 9, wherein step (c) further comprises:
if the desired clutch torque capacity is equal to or less than a commanded clutch torque, setting the increase in engine torque equal to or greater than the commanded clutch torque capacity.

16. The method of claim 9, wherein step (e) further comprises:
using vehicle speed and a speed ratio produced by a current gear of the transmission to determine a desired engine idle speed at which current slip across the clutch is produced; and
producing the desired engine idle speed.

* * * * *